(12) United States Patent
Okana

(10) Patent No.: US 6,332,641 B1
(45) Date of Patent: Dec. 25, 2001

(54) SIDE DOOR STRUCTURE FOR VEHICLE

(75) Inventor: Fumio Okana, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/587,442

(22) Filed: Jun. 5, 2000

(30) Foreign Application Priority Data

Jul. 14, 1999 (JP) .................................................. 11-200836

(51) Int. Cl.$^7$ .............................. B60J 5/04; B62D 25/04; B62D 25/20; B62D 25/05
(52) U.S. Cl. .................. 296/146.6; 296/188; 296/146.9; 296/204; 296/210; 296/202
(58) Field of Search ................................ 296/146.6, 210, 296/204, 188, 202, 146.1, 146.9

(56) References Cited

U.S. PATENT DOCUMENTS

| 1,639,037 | 8/1927 | Hollingshead . | |
|---|---|---|---|
| 1,869,274 | * 7/1932 | Phillips | 296/146.9 |
| 2,997,336 | * 8/1961 | Higgins et al. | 296/106 |
| 4,978,562 | * 12/1990 | Wycech | 428/35.8 |
| 5,096,254 | * 3/1992 | Sparke | 296/193 |
| 5,398,988 | 3/1995 | DeRees et al. . | |
| 5,752,737 | * 5/1998 | Heldt et al. | 296/146.6 |
| 5,782,523 | * 7/1998 | Heldt et al. | 296/146.6 |
| 5,855,394 | * 1/1999 | Horton et al. | 280/781 |
| 6,022,070 | 2/2000 | Ashina et al. . | |
| 6,059,352 | 5/2000 | Heldt et al. . | |
| 6,129,412 | * 10/2000 | Tanuma | 296/204 |

FOREIGN PATENT DOCUMENTS

| 2414114 | 10/1974 | (DE) . | |
|---|---|---|---|
| 0 220 414 A2 | 8/1986 | (EP) . | |
| 57041209A | * 3/1982 | (JP) | 296/146.4 |
| 09-150752 | 6/1997 | (JP) . | |
| 09150752 | 6/1997 | (JP) . | |
| 10-109662 | 4/1998 | (JP) . | |
| 10109662 | 4/1998 | (JP) . | |

OTHER PUBLICATIONS

Entre beline et monospace, 2392 Revue Automobile, 89 (1994) 39 Septembre, No. 40, Berne, CH, page 1.

* cited by examiner

Primary Examiner—Stephen T. Gordon
Assistant Examiner—Greg Blankenship
(74) Attorney, Agent, or Firm—Staas & Halsey LLP

(57) ABSTRACT

Double-leafed hinged door type front and rear doors do not have a center pillar in a side opening. In order that one can open and close the front and rear doors independently of each other and in order to protect passengers by absorbing any impact caused by side collision, reinforcing members (10, 11) obtained from high tensile steel by hydroforming are provided near joint surfaces of the front door (2) and rear door (3) provided to the side opening of a car body (1).

12 Claims, 15 Drawing Sheets

SIDE DOOR STRUCTURE FOR VEHICLE

FIELD OF THE INVENTION

The present invention relates to a side door structure for a vehicle and, more particularly, to a side door structure for a vehicle in which a double-leafed hinged door type side door is provided to the side portion of a car body.

BACKGROUND OF THE INVENTION

Conventionally, a vehicle provided with a side door, also called a double-leafed hinged door type side door, at the side portion of the car body has been put into practical use. In the double-leafed hinged door type vehicle, side openings with center pillars are respectively formed on two side surfaces of the car body. A front hinge is arranged at the front end of each side opening, so one can open and close the front door about this hinge. A rear hinge is arranged at the rear portion of each side opening, so one can open and close the front door about this hinge. The front and rear doors are locked by strikers provided to the center pillar, so they remain closed.

For example, according to Japanese Patent Laid-Open No. 10-109662, double-leafed hinged door type front and rear doors are assembled at a side portion of a car body. In this vehicle, in order that one can open and close the front door with the rear door being closed, the whole car body is composed of a skeleton member. A side surface opening is formed of side skeleton members. A front door whose front end is installed to a front skeleton member to form the side surface opening through hinges is provided. A rear door whose its rear end is installed to a rear skeleton member to form the side surface opening through hinges is also provided.

In recent years, a technique is proposed with which automobile components having complicated shapes can be obtained by hydroforming. According to this technique, a pipe-shaped material is prepared, is set in a mold, and is shaped or formed along the contour of the female die of the mold by increasing the inner pressure of the material. According to the technique disclosed in Japanese Patent Laid-Open No. 9-150752, an aluminum alloy pipe is bent three-dimensionally to form hoops. The hoops are subjected to warm blow forming to obtain frame bodies. These frame bodies are combined to complete a car body frame. Therefore, little scraps are generated from a given amount of material, so the yield improves.

SUMMARY OF THE INVENTION

According to the proposal of Japanese Patent Laid-Open No. 10-109662 described above, since the front door is opened/closed with the rear door being closed, doors must be opened and closed in a predetermined order, which is inconvenient for passengers who get on and off the vehicle. When front and rear doors are mounted at a side opening provided with a center pillar in each side surface of the car body, although the front and rear doors can be opened and closed independently of each other, the center pillar becomes an obstacle. As a result, for example, a passenger using a wheelchair cannot get on and off the vehicle or a large-size luggage cannot be loaded or unloaded through the side opening. In this manner, the side opening cannot be used effectively.

It is possible to assemble double-leafed hinged door type front and rear doors without using a center pillar in the side opening. When, however, the center pillar is omitted in this manner, the rigidity of the car body may be impaired. With a center-pillar-less structure, in the case of a side collision, the colliding vehicle bores this vehicle more, and accordingly passengers cannot be protected. As a measure against this, reinforcing members may be incorporated in or fixed to door sash portions which form joint surfaces for the front and rear doors. Since the front and rear doors near the joint surfaces have -complicated shapes, it is rather difficult to mount reinforcing members on them.

The present invention has been made in view of the problems described above, and has as its object to provide a side door structure for a vehicle in which, when using double-leafed hinged door type front and rear doors without a center pillar in a side opening, the front and rear doors can be opened and closed independently of each other, a sufficiently large car body rigidity can be ensured, and the degree with which another vehicle bores the vehicle compartment, in case a of side collision, is reduced, thereby realizing passenger protection.

In order to solve the above problems and to achieve the above object, according to the present invention, there is provided a side door structure for a vehicle, comprising a front door having a front end openably/closeably supported by a front hinge disposed at a front portion of a side opening of a car body, and a rear door having a rear end openably/closeably supported by a rear hinge disposed at a rear portion of the side opening, characterized in that a reinforcing member obtained from high tensile steel by hydroforming is fixed to one or both of the front and rear doors along joint-surfaces of the front door and the rear door in a vertical direction.

The side door structure for a vehicle is also characterized in that a side impact bar is provided to one or both of the front door and the rear door in a back-and-forth direction of the car body, and an end of the side impact bar is fixed to the reinforcing member.

The side door structure for a vehicle is also characterized in that a belt line member is provided to one or both of the front door and the rear door in a back-and-forth direction of the car body, and an end of the belt line member is fixed to the reinforcing member.

The side door structure for a vehicle is also characterized in that a ceiling cross member obtained from high tensile steel by hydroforming is provided to a ceiling of the car body to extend in a widthwise direction of the car body, and an upper end of the reinforcing member overlaps an end face of the ceiling cross member.

The side door structure for a vehicle is also characterized in that a floor surface cross member obtained from high tensile steel by hydroforming is provided to a floor surface of the car body to extend in a widthwise direction of the car body, and a lower end of the reinforcing member overlaps an end face of the floor surface cross member.

The side door structure for a vehicle is also characterized in that hollow portions of the reinforcing member, ceiling cross member, and floor surface cross member are filled with a filler.

The side door structure for a vehicle is also characterized by comprising door handles respectively provided to the front and rear doors, locking means for unlocking the front and rear doors upon operation of the door handles, front strikers provided to upper and lower edges of the side opening at substantially central portions, and rear strikers provided behind the front strikers, wherein the locking means are operated independently of each other to allow the front and rear doors to be openable and closeable independently of each other. The side door structure for a vehicle is also characterized in that the front and rear strikers are fixed by using plate members.

As described above, according to the invention described in claim 1, in a side door structure for a vehicle, comprising a front door having a front end openably/closeably supported by a front hinge disposed at a front portion of a side opening of a car body, and a rear door having a rear end openably/closeably supported by a rear hinge disposed at a rear portion of the side opening, a reinforcing member obtained from high tensile steel by hydroforming is fixed to one or both of the front and rear doors along joint surfaces of the front door and the rear door in a vertical direction. Therefore, when using double-leafed hinged door type front and rear doors without a center pillar in the-side opening, the front and rear doors can be opened/closed independently of each other, and the reinforcing members having a complicated shape can be provided near the joint surfaces of the front and rear doors. Hence, a sufficiently large car body rigidity can be ensured.

According to the invention described in claim 2, a side impact bar is provided to one or both of the front door and the rear door in a back-and-forth direction of the car body, and an end of the side impact bar is fixed to the reinforcing member. Therefore, in the case of side collision, another vehicle bores the car compartment less, so passengers can be protected.

According to the invention described in claim 3, a belt line member is provided to one or both of the front door and the rear door in a back-and-forth direction of the car body, and an end of the belt line member is fixed to the reinforcing member. Therefore, the degree with which another vehicle bores the car compartment of a vehicle in the case of side collision can be further reduced.

According to the invention described in claim 4, a ceiling cross member obtained from high tensile steel by hydroforming is provided to a ceiling of the car body to extend in a widthwise direction of the car body, and an upper end of the reinforcing member overlaps an end face of the ceiling cross member. Therefore, the degree with which another vehicle bores the car compartment of a vehicle at the ceiling portion, in the case of side collision, can be further reduced. According to the invention described in claim 5, a floor surface cross member obtained from high tensile steel by hydroforming is provided to a floor surface of the car body to extend in a widthwise direction of the car body, and a lower end of the reinforcing member overlaps an end face of the floor surface cross member. Therefore, the degree with which another vehicle bores the car compartment of a vehicle at the floor surface, in the case of side collision, can be further reduced.

According to the invention described in claim 6, hollow portions of the reinforcing member, ceiling cross member, and floor surface cross member are filled with a filler, so that the strength can be further increased.

According to the invention described in claim 7, the side door structure for a vehicle is also characterized by comprising door handles respectively provided to the front and rear doors, locking means for unlocking the front and rear doors upon operation of the door handles, front strikers provided to upper and lower edges of the side opening at substantially central portions, and rear strikers provided behind the front strikers, wherein the locking means are operated independently of each other, so the front and rear doors be opened and closed independently of each other. Therefore, the front and rear doors can be opened and closed independently of each other.

According to the invention described in claim 8, the front and rear strikers are fixed by using plate members, so that the front and rear doors can be prevented from being unlocked in the case of side collision.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The embodiment of the present invention will be described in detail with reference to the accompanying drawings.

Figure 1:
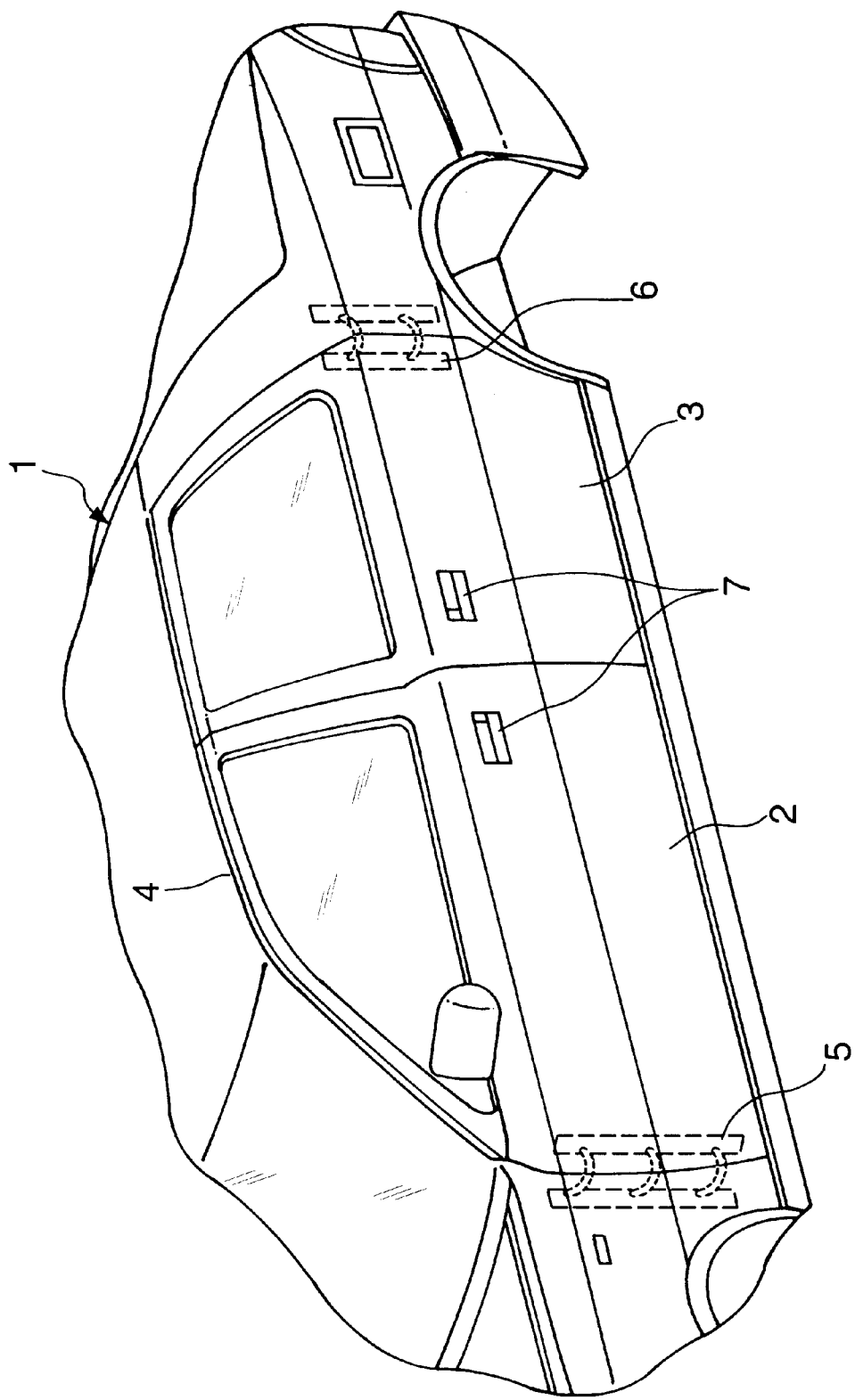
FIG. 1 is a perspective view of the outer appearance of a side door structure for a vehicle according to an embodiment of the present invention, which is applied to a four-door sedan.

FIG. 1 is a perspective view seen from obliquely upward of the outer appearance of a side door structure for a vehicle according to the first embodiment of the present invention, which is applied to a vehicle having the outer appearance of a four-door sedan. Referring to FIG. 1, the present invention is not limited to a vehicle having the shape shown in FIG. 1, but can be applied to a hatchback-, sedan-, or minivan-type vehicle, and various types of business cars, as a matter of course.

Referring to FIG. 1, a vehicle 1 has a front door 2 having a front end supported by a front hinge 5 (indicated by a broken line) fixed to the front portion of a side opening 4 of the car body 1, and a rear door 3 having a rear end openably/closeably supported by a rear hinge 6 (indicated by a broken line) disposed at the rear portion of the side opening 4. A weather strip (to be described later) is provided at the joint surfaces between the front and rear doors 2 and 3. The front and rear doors 3 are respectively provided with door handles 7 at positions shown in FIG. 1. When the door handles 7 are operated independently of each other, the front and rear doors 3 locked by strikers fixed to the car body are unlocked by unlocking means (not shown) incorporated in these doors, and can be opened/closed independently of each other.

Figure 2:
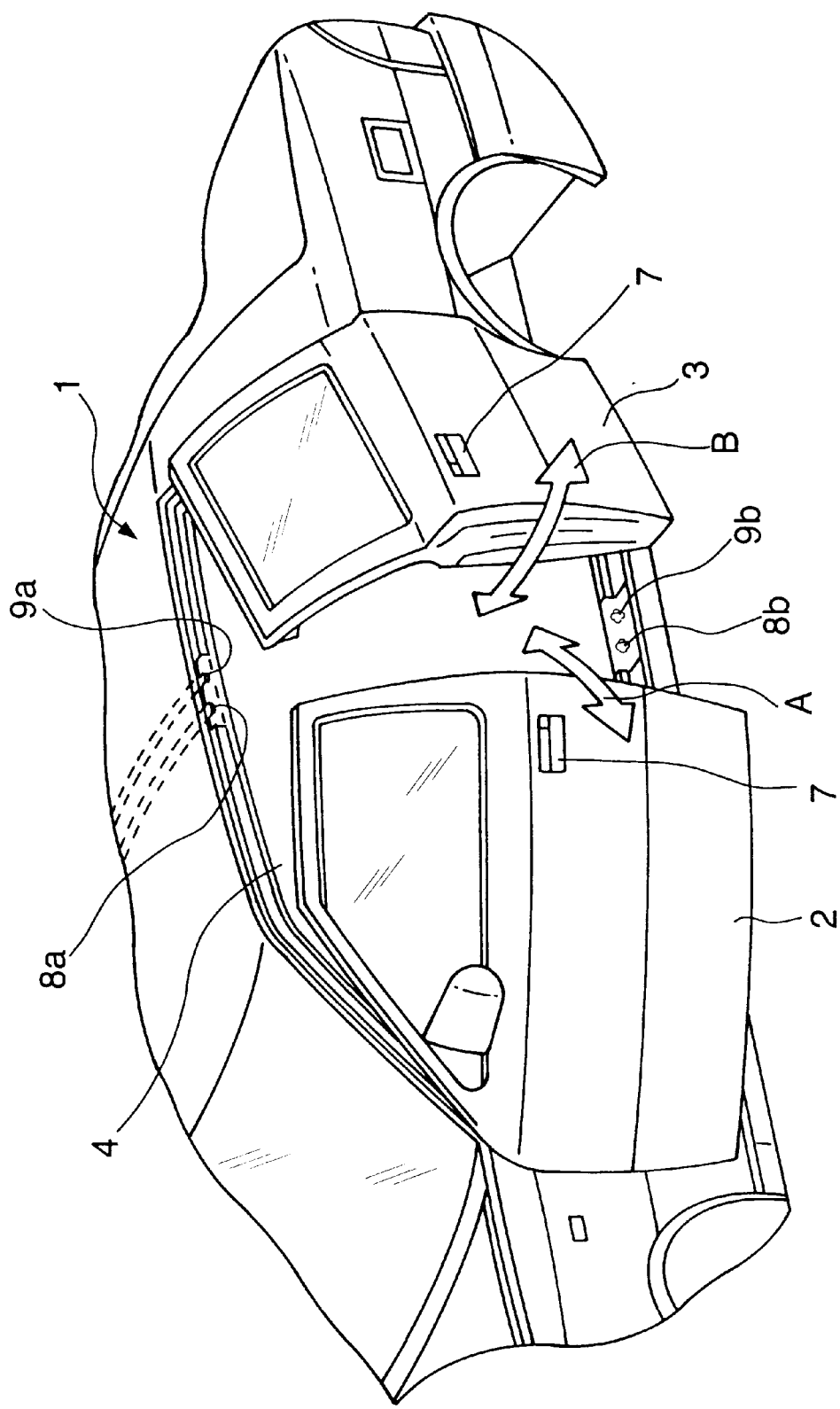
FIG. 2 is a perspective view of the outer appearance of the front and rear doors of the four-door sedan shown in FIG. 1 that are opened halfway.

FIG. 2 is a perspective view of an outer appearance showing a state wherein the front and rear doors 2 and 3 are opened halfway. As shown in FIG. 2, the front and rear doors 2 and 3 form a center-pillar-less structure in which no center pillar is provided to the side opening 4. Therefore, as the strikers, a front striker 8a and a rear striker 9a fixed to near the side portion of the roof, and a front striker 8b and a rear striker 9b fixed to near the floor surfaces are provided. While the front door 2 is locked by the front strikers 8a and 8b, the rear door 3 is locked by the rear strikers 9a and 9b, so that the doors remain open as shown in FIG. 1. Also, the front and rear doors 2 and 3 can be opened and closed independently of each other in directions indicated by arrows A and B, as shown in FIG. 2.

Figure 3:
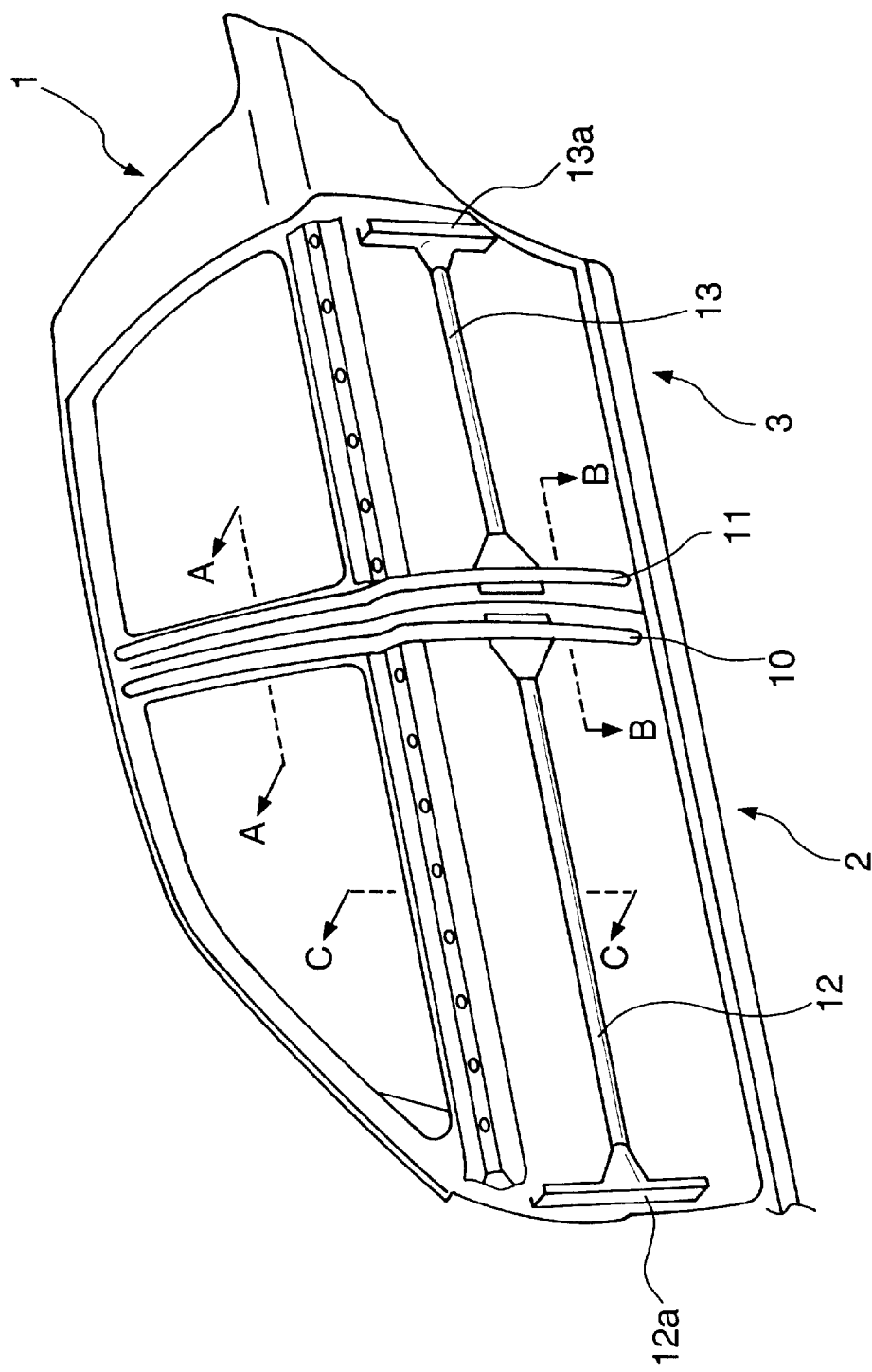
FIG. 3 is a perspective view of the outer appearance of the front and rear doors of the four-door sedan shown in FIG. 2 from which outer panels are omitted.

FIG. 3 is a perspective view of an outer appearance showing the front and rear doors 2 and 3 from which outer panels are removed. Referring to FIG. 3, the constituent components that are already described are denoted by the same reference numerals as those employed above, and a detailed description thereof will be omitted. The front door 2 incorporates a front side impact bar 12 having two ends to which fixing brackets 12a are fixed. The front fixing bracket 12a is fixed to the hinge to increase the strength, so that the strength against side collision is ensured.

A front reinforcing member 10 is fixed to be substantially parallel to the joint surfaces of the front and rear doors 2 and 3. The rear end of the front side impact bar 12 is fixed to this front reinforcing member 10.

The rear door 3 incorporates a rear side impact bar 13 having two ends to which fixing brackets 13a are fixed. The front fixing bracket 13a is fixed to a rear reinforcing member 11 to increase the strength, so that the strength against side collision is ensured. The rear end of the rear side impact bar 13 is fixed to the rear hinge 6.

Figure 4:
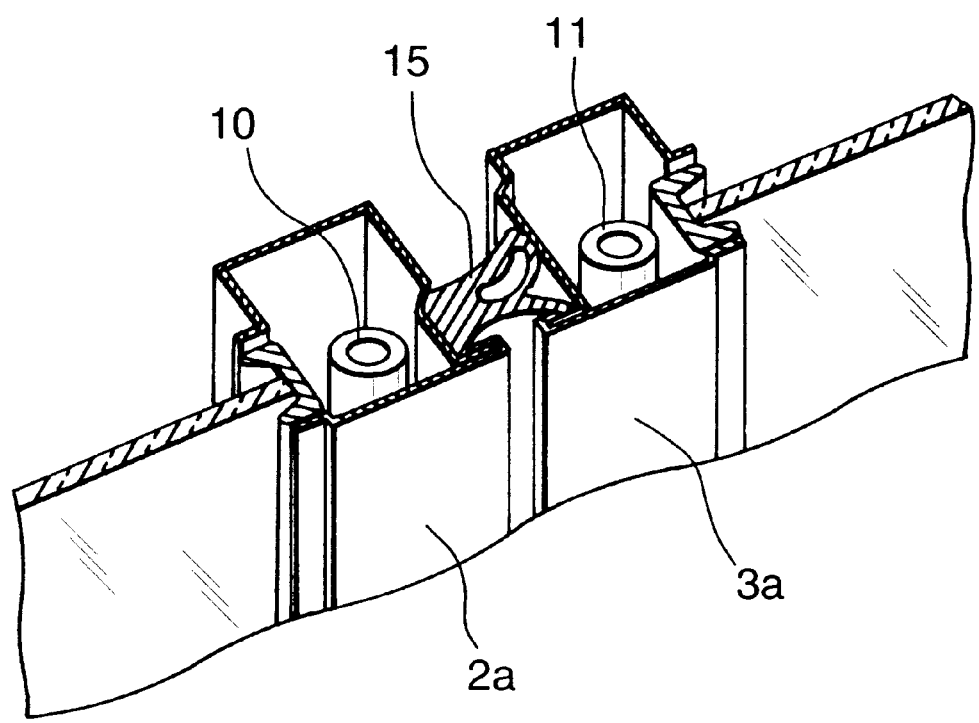
FIG. 4 is a perspective view of an outer appearance showing a section taken along the line of arrows A—A of FIG. 3.

FIG. 4 is a perspective view of an outer appearance showing a section taken along the line of arrows A—A of FIG. 3. FIG. 4 typically shows the joint portion of the front and rear doors. Referring to FIG. 4, when the front and rear doors 2 and 3 are closed, a door sash 2a of the front door 2 and a door sash 3a of the rear door 3 are joined as shown in FIG. 4. More specifically, a weather strip 15 is fixed to extend downward from the door sash 2a of the front door 2. Two lips branching from the weather strip 15 butt against the inner and lower sides of the door sash 3a of the rear door 3, thereby providing a good seal.

Figure 5:
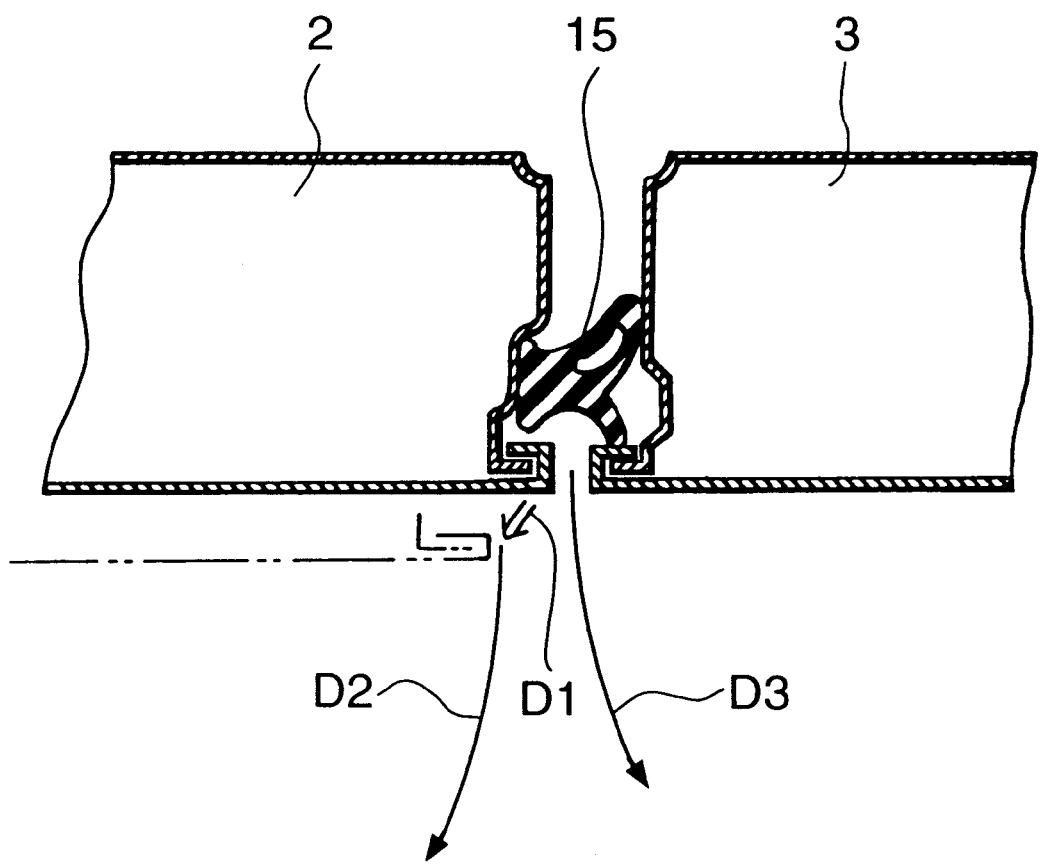
FIG. 5 is a sectional view taken along the line of arrows B—B of FIG. 3.

FIG. 5 is a sectional view taken along the line of arrows B—B of FIG. 3, and shows the joint portion between the front and rear doors. Referring to FIG. 5, the weather strip 15 described with reference to FIG. 4 is fixed to depend continuously from the door sash 2a of the front door 2, thereby sealing the front and rear doors entirely in the vertical direction.

When the front door 2 sealed in this manner is simply pivoted open, a force is generated which moves outward the lips of the weather strip 15, which have deformed as they abut against the closed rear door. As a result, the service life of the weather strip is greatly degraded. When the front door is opened or closed, an excessive load is generated by deformation of the weather strip 15, and adversely influences the operability of the door upon opening/closing it. On the other hand, when the rear door 3 is moved to pivot in the direction of an arrow D3, an excessive force that moves the lips of the weather strip 15 outward is not generated.

Under the circumstance, the front door 2 is opened and closed along a composite track such that after it moves substantially linearly in the direction of an arrow D1, it pivots in the direction of an arrow D2. Hence, a force that moves the lips of the weather strip outward is not generated.

Figure 6:
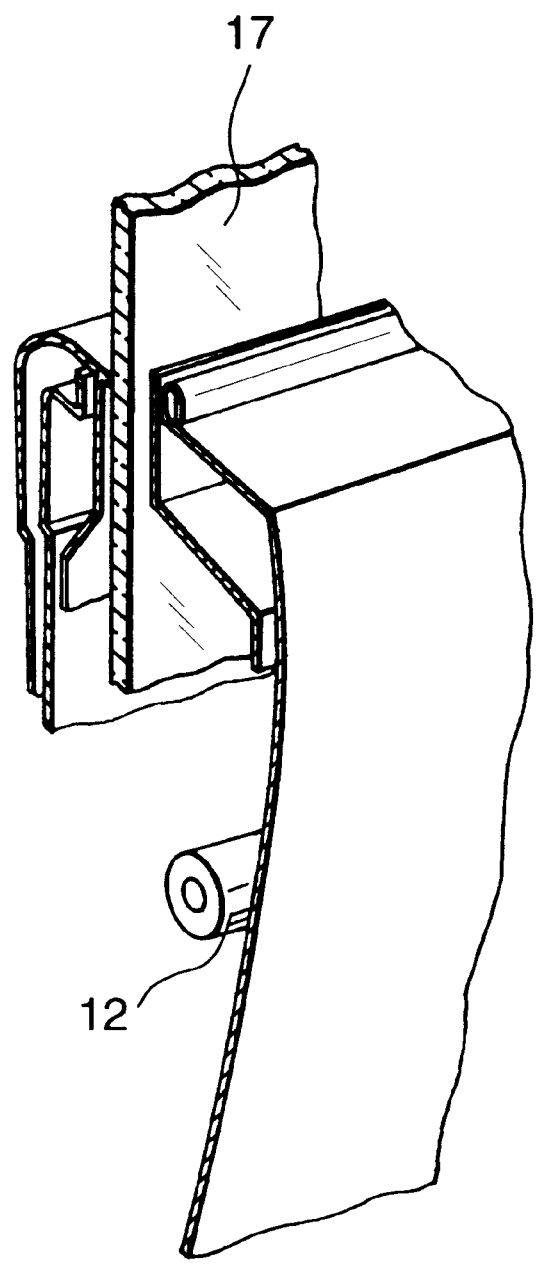
FIG. 6 is a perspective view showing a section taken along the line of arrows C—C of FIG. 3.

FIG. 6 is a perspective view showing a section taken along the line of arrows C—C of FIG. 3. As shown in FIG. 6, since the front side impact bar 12 is incorporated in a space between the inner and outer panels, passengers are protected from the impact of side collision. A side window 17 is sandwiched between belt line members to be vertically movable, as shown in FIG. 6.

Figure 7:
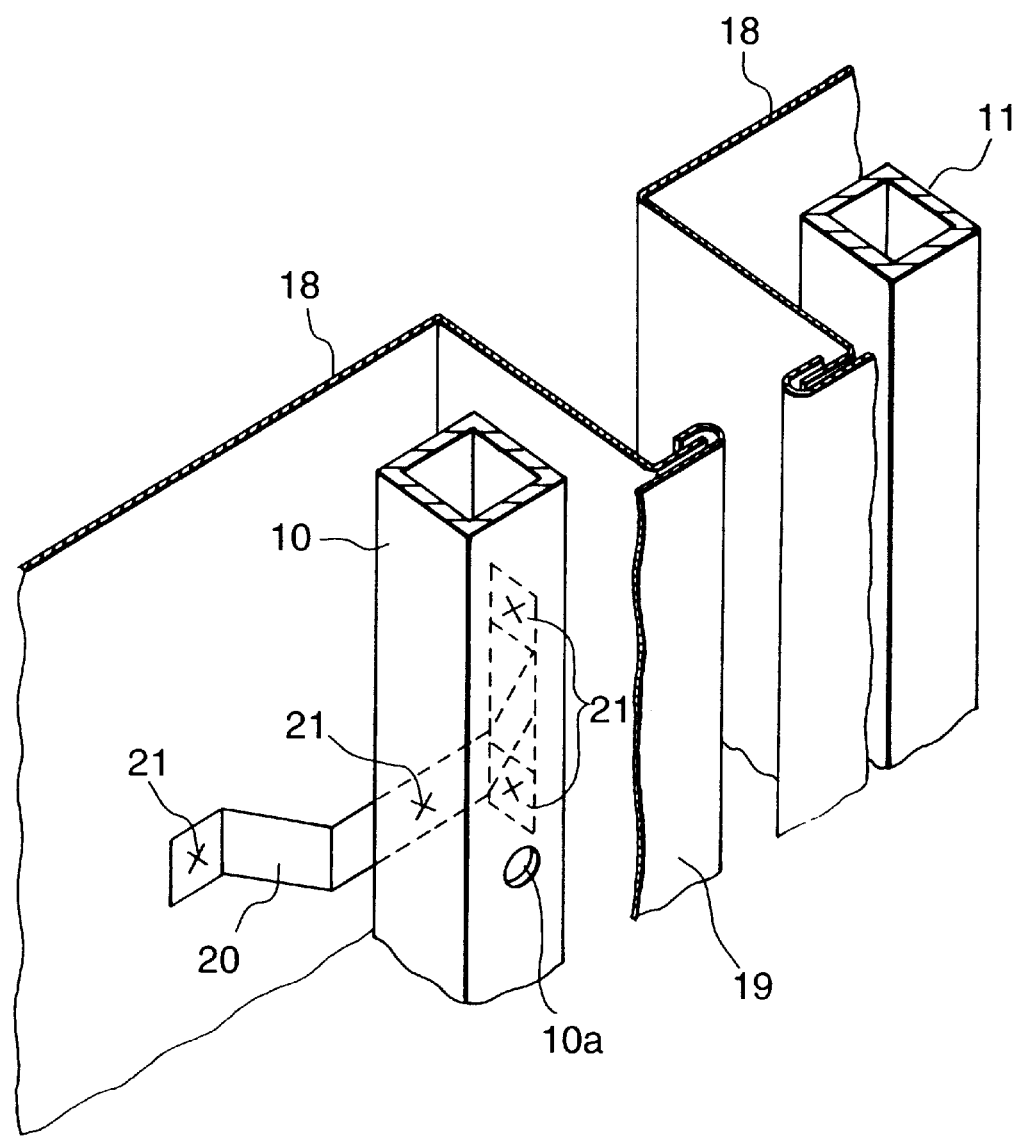
FIG. 7 is a perspective view of an outer appearance showing a section taken at an intermediate portion-between the line of arrows A—A and the line of arrows B—B of FIG. 3.
Figure 8:
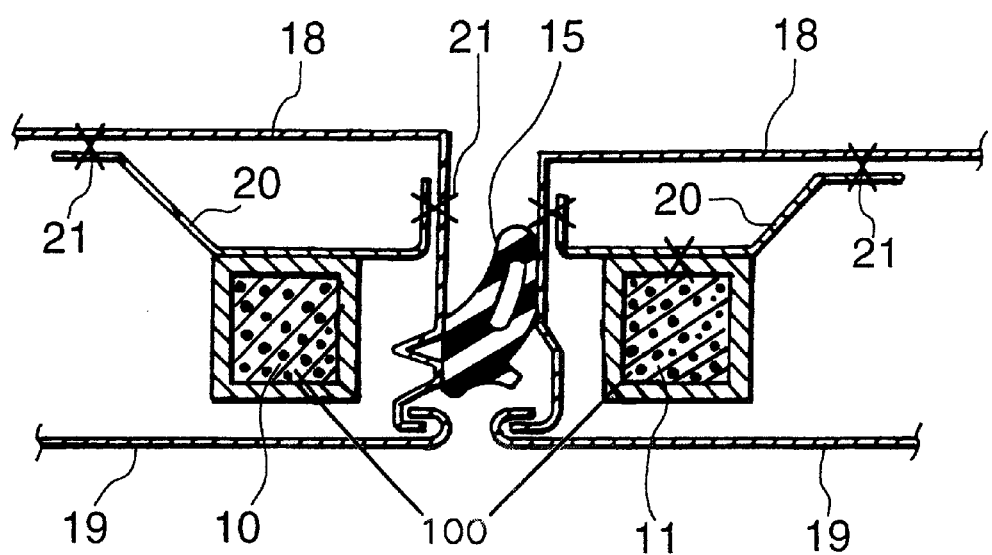
FIG. 8 is a sectional view taken along the line of arrows B—B of FIG. 3.

FIG. 7 is a perspective view showing a section taken at substantially an intermediate portion between the line of arrows A—A and the line B—B of FIG. 3, and shows the front and rear reinforcing members 10 and 11 (described above) incorporated near the joint surfaces of the front and rear doors. FIG. 8 is a sectional view taken along the line of arrows B—B of FIG. 3. Referring to FIGS. 7 and 8, the front and rear reinforcing members 10 and 11 are obtained as hollow members from high tensile steel by hydroforming, as shown in FIGS. 7 and 8, and are fixed to the joint surfaces between the front and rear doors 2 and 3 in the vertical direction through fixing brackets 20. Although FIGS. 7 and 8 show a case wherein the front and rear reinforcing members 10 and 11 are fixed to the front and rear doors 2 and 3, a reinforcing member may be provided to only one of the front and rear doors 2 and 3. The reinforcing member 10 has a hole 10a pierced during hydroforming described above. An electrode for spot welding is inserted in the hole 10a, and the bracket 20 is fixed to the reinforcing member 10 by welding it at spot welding portions 21. The bracket 20 fixed in this manner is welded to an inner panel 18 of the door and the side surface of the inner panel 18 at the spot welding portions 21, so that the reinforcing member 10 can be positioned in a space defined by the inner panel 18 and an outer panel 19. Although the reinforcing members 10 and 11 fixed in this manner have complicated shapes, they can be manufactured easily by hydroforming described above.

Figure 9A:
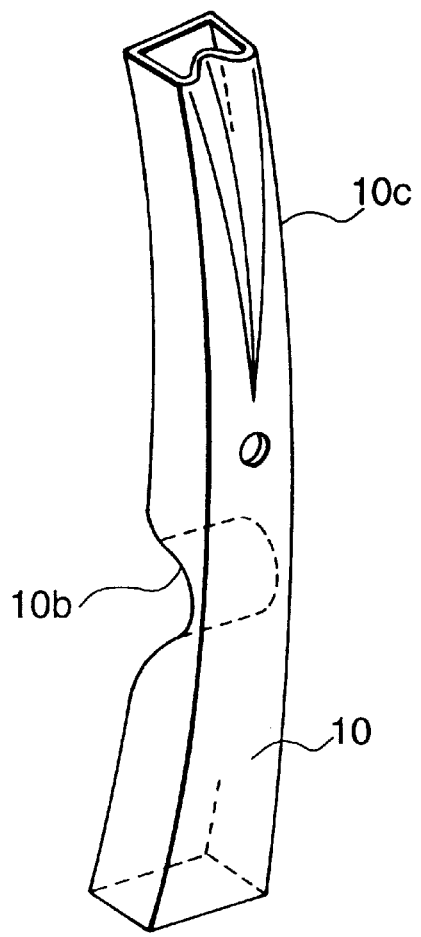
FIG. 9A is a perspective view of the outer appearance of a reinforcing member.
Figure 9B:
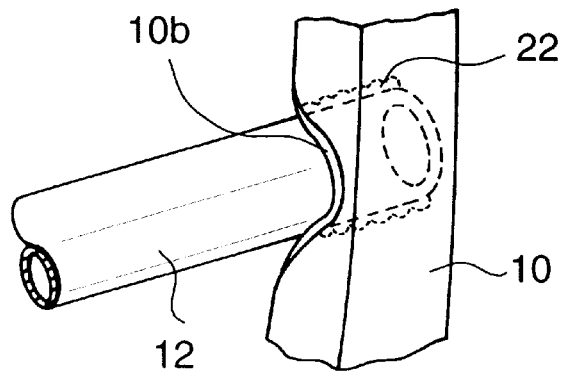
FIG. 9B is a perspective view of the outer appearance of a bonding portion between the reinforcing member and a side impact bar.

FIG. 9A is a perspective view of the outer appearance of the reinforcing member 10, and FIG. 9B is a perspective view of the outer appearance showing the bonding portion between the reinforcing member 10 and side impact bar 12. Referring to FIGS. 9A. and 9B, since the circumferential length of the front reinforcing member 10 manufactured by hydrofoam described above cannot be less than the circumferential length of the material, the reinforcing member 10 is formed with a portion 10c where it is bent inward for an amount corresponding to the unnecessary, extra length. The front reinforcing member 10 is recessed midway along it to form a recess lob, as shown in FIGS. 9A and 9B. Therefore, the side impact bar 12 can be welded to the reinforcing member 10. The rear end portion of the front side impact bar 12 is set in this recess 10b, as shown in FIG. 9B, and is welded at a continuous welding portion 22. As a result, the rigidity of the front door is increased, and the car compartment can be effectively prevented from being invaded in the case of side collision. Although not shown, a side impact bar and a rear reinforcing member are fixed to the rear door by welding to increase the strength.

Figure 10:
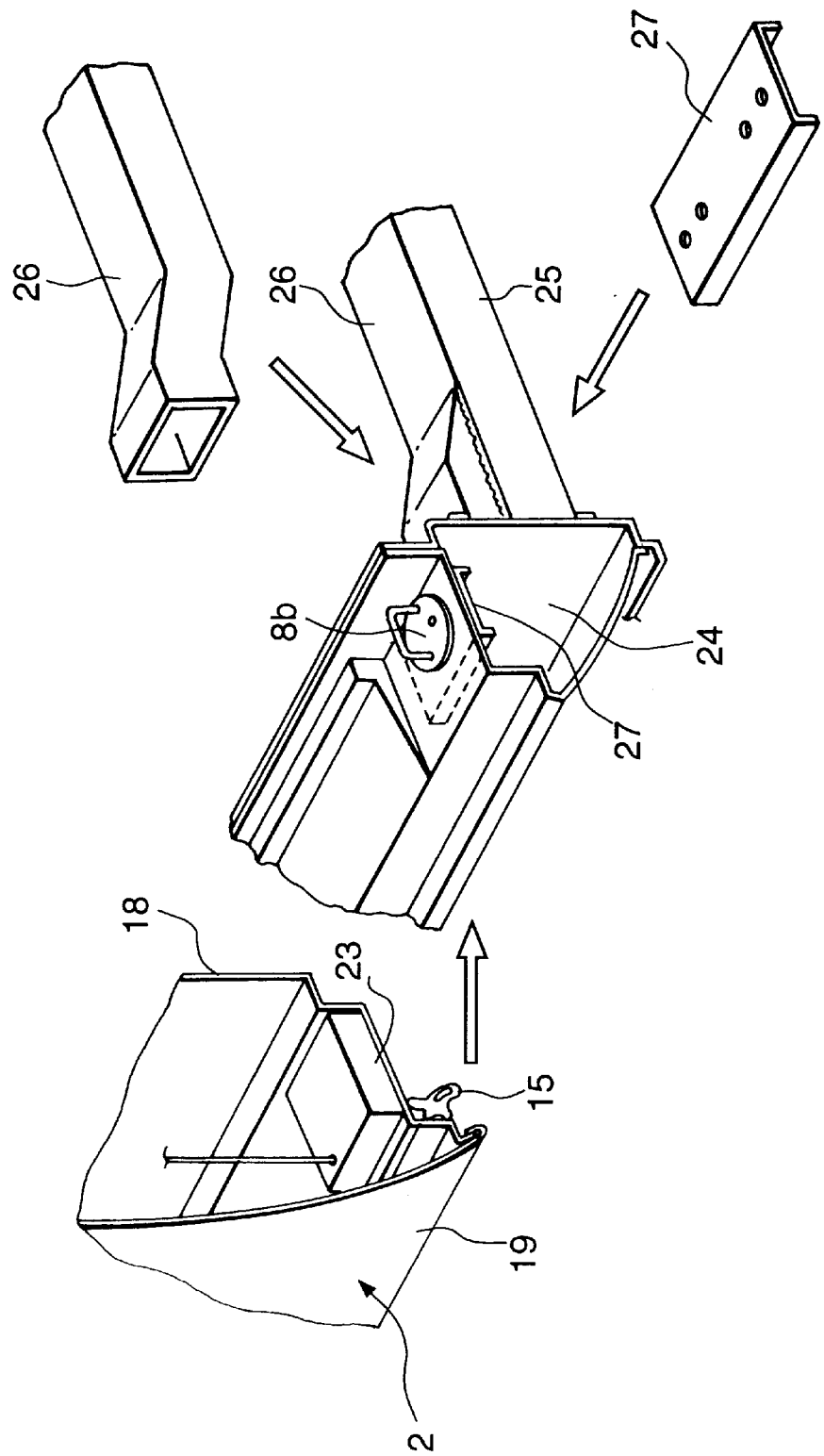
FIG. 10 is a perspective view of an outer appearance showing the relationship between a locking unit 23 serving as a locking means and a front striker 8b, which are provided at the lower portion of a front door 2.
Figure 11:
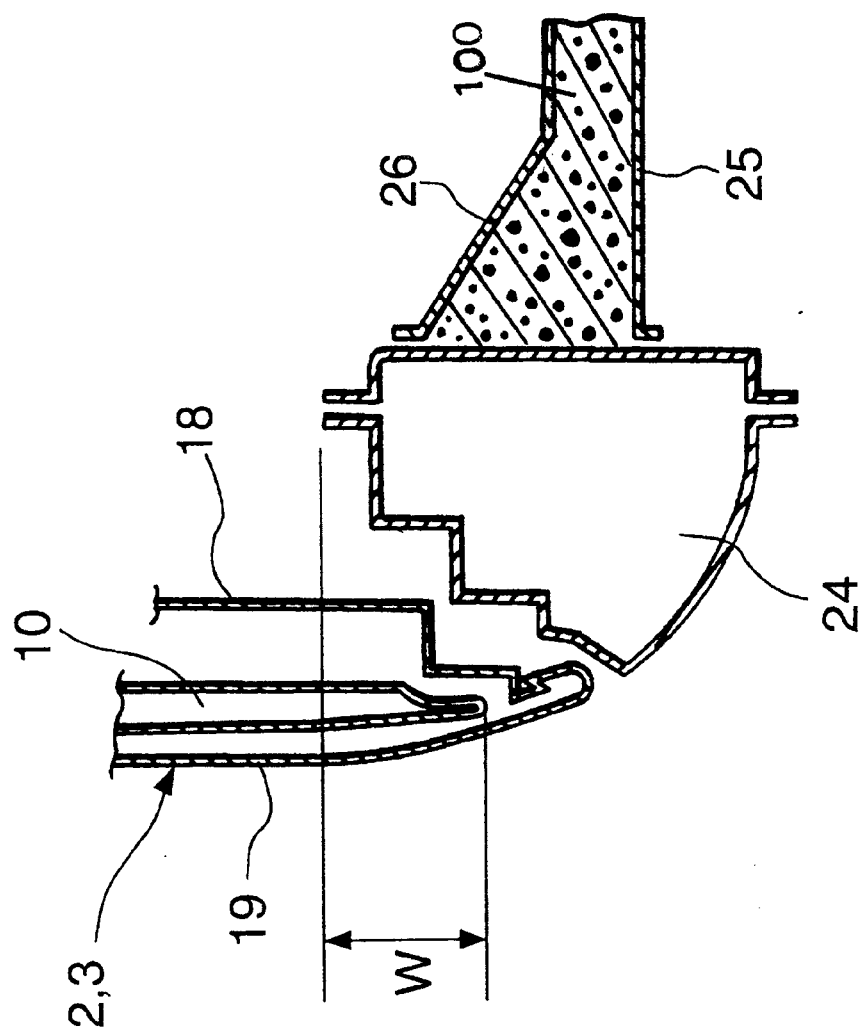
FIG. 11 is a cross-sectional view of FIG. 10.

FIG. 10 is a perspective view of an outer appearance showing the relationship between a locking unit 23 serving as a locking means and a front striker 8b, which are provided at the lower portion of the front door 2, and FIG. 11 is a cross-sectional view of FIG. 10.

Referring to FIGS. 10 and 11, the constituent components that are already described are denoted by the same reference numerals as those employed above, and a detailed description thereof will be omitted. The front door 2 incorporates the locking unit 23 operated by the door handle 7. In a lower side sill 24 of the car body, a plate member 27 is provided in advance by spot welding at a position corresponding to the front and rear strikers 8b and 9b, and the respective strikers are fixed on the plate member 27 to increase the strength. A floor surface floor panel 25 of the vehicle continues from the lower side sill 24. A floor surface cross member 26 molded by hydroforming described above is fixed onto the floor surface floor panel 25 to extend in the widthwise direction. The two ends of the floor surface cross member 26 are located near the respective strikers.

As shown in FIG. 11, the floor surface cross member 26 obtained from high tensile steel by hydroforming has an end face overlapping the front reinforcing member 10 for a distance W. Therefore, in the case of side collision, the floor surface cross member 26 deforms to absorb the external force acting on it together with the lower side sill 24.

Figure 12:
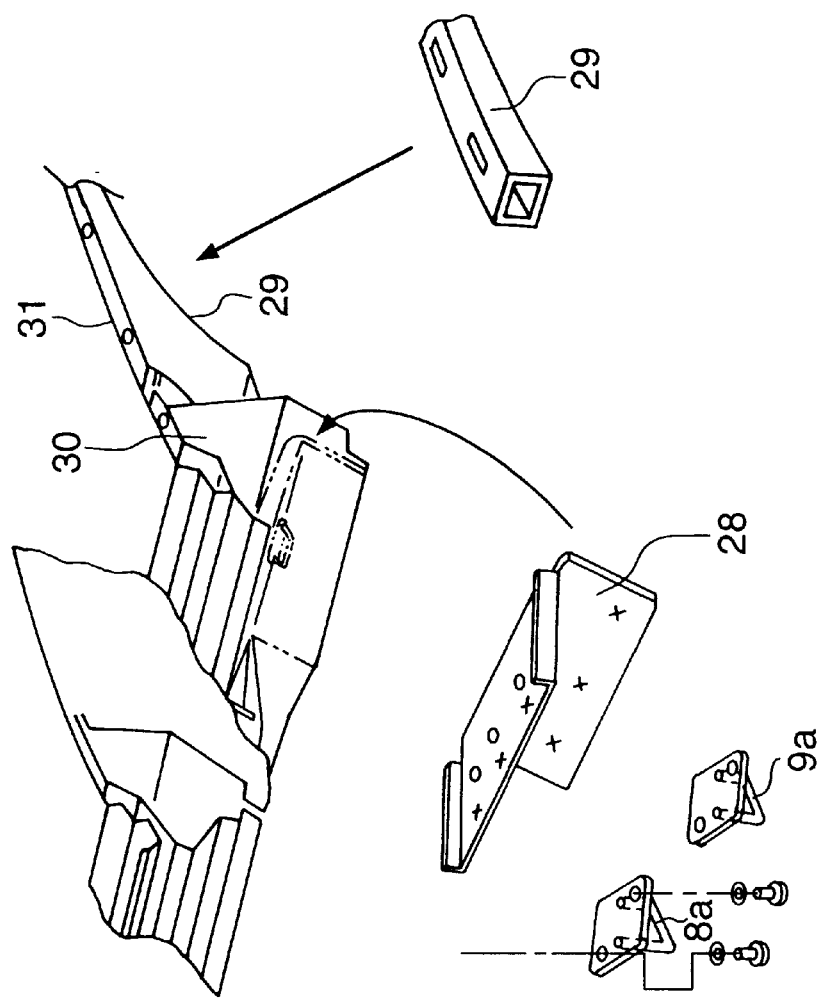
FIG. 12 is a perspective view of an outer appearance showing the relationship between a locking unit 23 serving as a locking means and a front striker 8a, which are provided at the upper portion of the front door 2.
Figure 12:
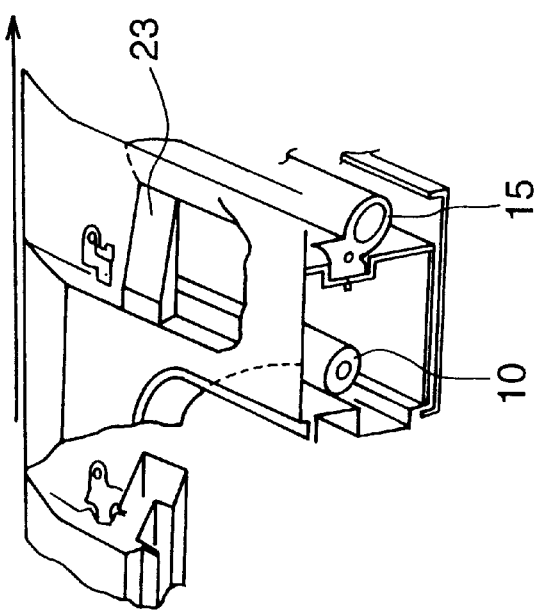
Figure 13:
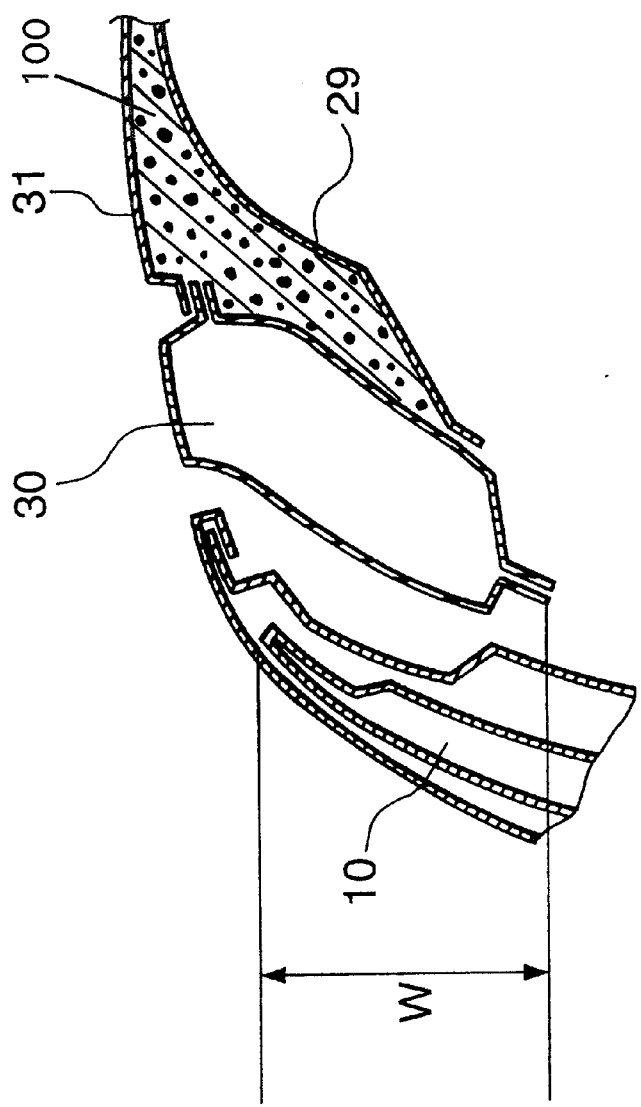
FIG. 13 is a cross-sectional view of FIG. 12.

FIG. 12 is a perspective view of an outer appearance showing the relationship between a locking unit 23 serving as a locking means and a front striker 8a, which are provided at the upper portion of the front door 2, and FIG. 13 is a cross-sectional view of FIG. 12.

Referring to FIGS. 12 and 13, the constituent components that are already described are denoted by the same reference numerals as those employed above, and a detailed description thereof will be omitted. The front door 2 incorporates the locking unit 23 operated by the door handle 7. In an upper side sill 30 of the car body, a plate member 28 is provided in advance by spot welding at a position corresponding to the front and rear strikers 8a and 9a, and the respective strikers are fixed on the plate member 28 to increase the strength. A roof panel 31 of the vehicle continues from the upper side sill 30. A ceiling cross member 29 molded by hydroforming described above is fixed to the car compartment located below the roof panel 31, to extend in the widthwise direction of the car body. The two ends of the ceiling cross member 29 are located near the respective strikers.

As shown in FIG. 13, the ceiling cross member 29 obtained from high tensile steel by hydroforming has an end face overlapping the front reinforcing member 10 for a distance W. Therefore, in the case of side collision, the ceiling cross member 29 deforms to absorb the external force acting on it together with the upper side sill 30.

Figure 14:
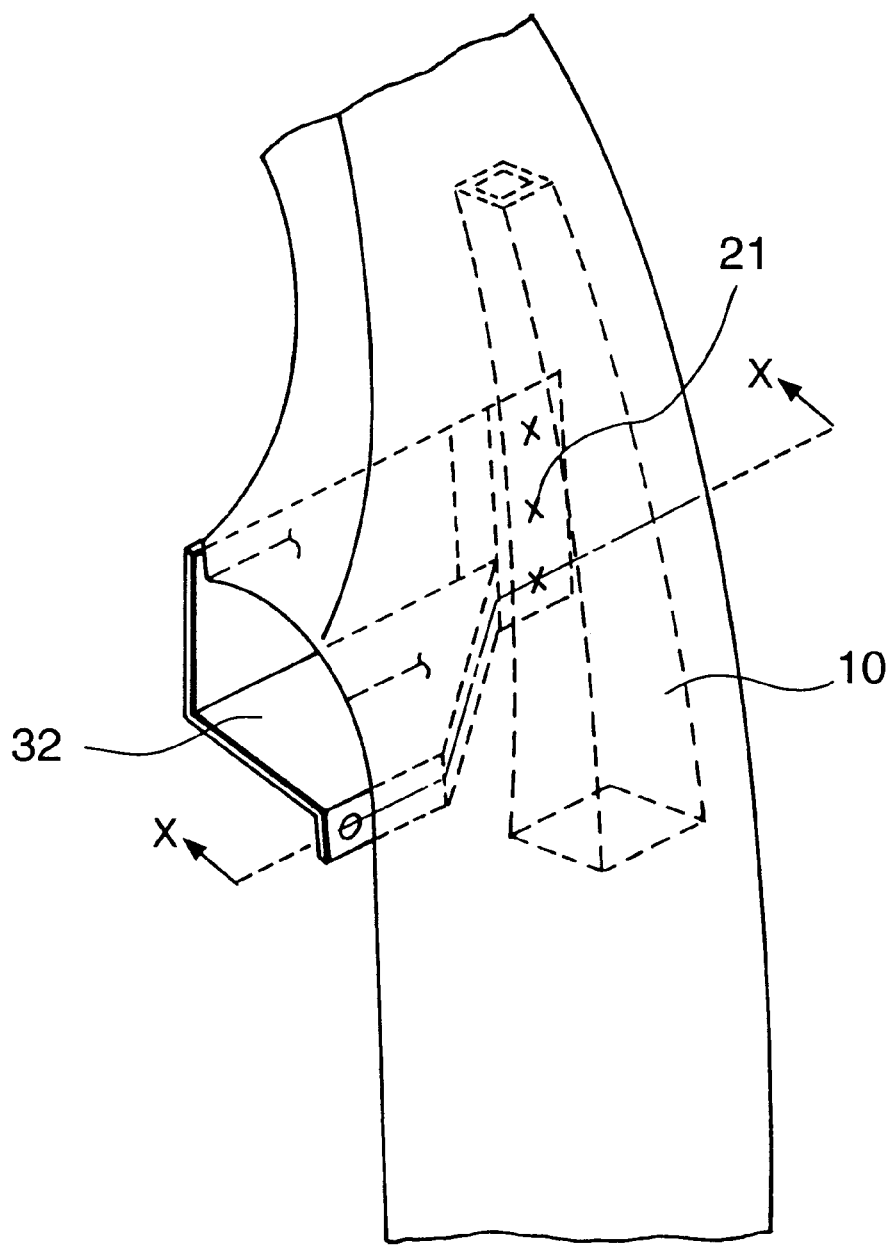
FIG. 14 is a perspective view of an outer appearance showing the bonding state of a belt line member and the reinforcing member.
Figure 15:
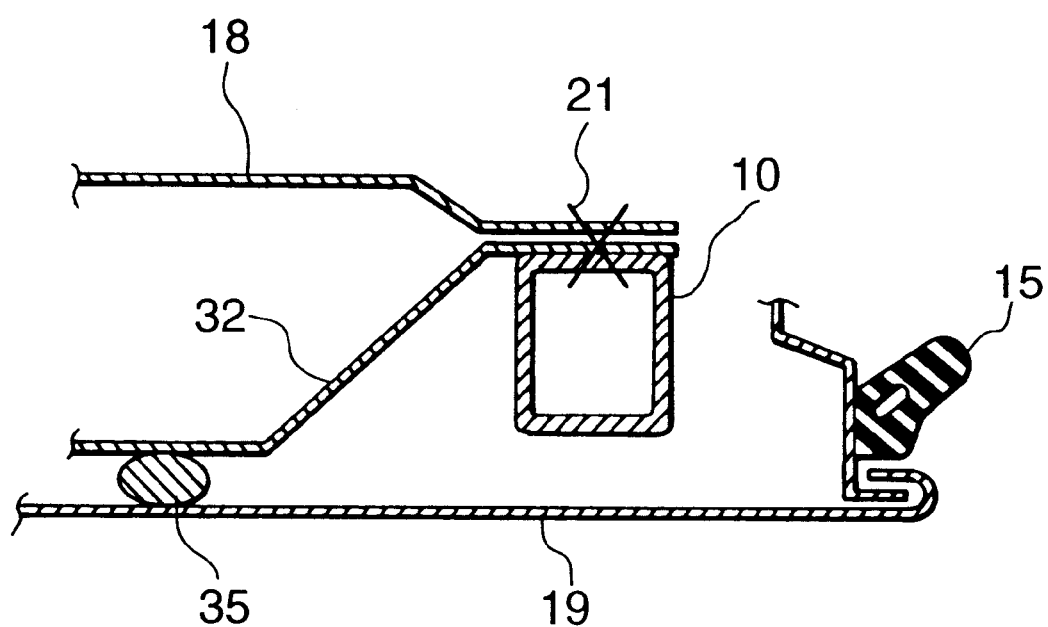
FIG. 15 is a sectional view taken along the line of arrows X—X of FIG. 14.

FIG. 14 is a perspective view of an outer appearance showing a state wherein a belt line member 32 is provided near the opening of the side window to sandwich the side window together with another member and is welded to the reinforcing member 10, and FIG. 15 is a sectional view taken along the line of arrows X—X of FIG. 14.

Referring to FIGS. 14 and 15, the constituent components that are already described are denoted by the same reference numerals as those employed above, and a detailed description thereof will be omitted. The belt line member 32 is fixed to the front reinforcing member 10 at the spot welding portions 21. An adhesive seal 35 is interposed between the outer panel 19 and belt line member 32 to fix them.

When the belt line member 32 having the above arrangement is further provided, an impact acting upon When the hollow portions of the front and rear reinforcing members 10 and 11, ceiling cross member 29, and floor surface cross member 26 are filled with a predetermined filler 100, the strength can be further increased.

As described above, when the double-leafed hinged door type front and rear doors 2 and 3 do not have a center pillar in the side opening, they can be opened/closed independently of each other. Since any impact acting upon side collision is absorbed, passengers can be protected.

As many apparently widely different embodiments of the present invention can be made without departing from the spirit and scope thereof, it is to be understood that the invention is not limited to the specific embodiments thereof except as defined in the appended claims.

What is claimed is:

1. A side door structure for a vehicle, comprising:
   a front door having a front end openably/closeably supported by a front hinge disposed at a front portion of a side opening of a car body, and a rear door having a rear end openably/closeably supported by a rear hinge disposed at a rear portion of said side opening,
   wherein a hollow integral reinforcing member obtained from high tensile steel by hydroforming is fixed to one or both of said front and rear doors along joint surfaces between said front door and said rear door in a vertical direction such that said reinforcing member is fixed between an inner panel and an outer panel of said front door along an inside of a front door sash, and said reinforcing member is fixed between an inner panel and an outer panel of said rear door along an inside of a rear door sash.

2. The structure according to claim 1, wherein a side impact bar is provided to one or both of said front door and said rear door in a back-and-forth direction of said car body, and an end of said side impact bar is fixed to said reinforcing member.

3. The structure according to claim 2, wherein a belt line member is provided to one or both of said front door and said rear door in a back-and-forth direction of said car body, and an end of said belt line member is fixed to said reinforcing member.

4. The structure according to claim 2, wherein a belt line member is provided to one or both of said front door and said rear door in a back-and-forth direction of said car body, and an end of said belt line member is fixed to said reinforcing member.

5. The structure according to claim 1, wherein a ceiling cross member obtained from high tensile steel by hydroforming is provided to a ceiling of said car body to extend in a widthwise direction of said car body, and an upper end of said reinforcing member overlaps an end face of said ceiling cross member.

6. The structure according to claim 2, wherein a ceiling cross member obtained from high tensile steel by hydroforming is provided to a ceiling of said car body to extend in a widthwise direction of said car body, and an upper end of said reinforcing member overlaps an end face of said ceiling cross member.

7. The structure according to claim 1, wherein a floor surface cross member obtained from high tensile steel by hydroforming is provided to a floor surface of said car body to extend in a widthwise direction of said car body, and a lower end of said reinforcing member overlaps an end face of said floor surface cross member.

8. The structure according to claim 1, wherein said reinforcing member is filled with a filler.

9. The structure according to claim 5, wherein a hollow portion of said ceiling cross member is filled with a filler.

10. The structure according to claim 7, wherein a hollow portion of said floor surface cross member is filled with a filler.

11. A side door structure for a vehicle, comprising:

a front door having a front end openably/closeably supported by a front hinge disposed at a front portion of a side opening of a car body, and a rear door having a rear end openably/closeably supported by a rear hinge disposed at a rear portion of said side opening, and door handles respectively provided to said front and rear doors, locking means for unlocking said front and rear doors upon operation of said door handles, front strikers provided to upper and lower edges of said side opening at substantially central portions, and rear strikers provided behind said front strikers, wherein said locking means are operated independently of each other, so said front and rear doors can be opened and closed independently of each other, wherein a reinforcing member obtained from high tensile steel by hydroforming is fixed to one or both of said front and rear doors along joint surfaces between said front door and said rear door in a vertical direction.

12. The structure according to claim 11, wherein said front and rear strikers are fixed by using plate members.

* * * * *

UNITED STATES PATENT AND TRADEMARK OFFICE
CERTIFICATE OF CORRECTION

PATENT NO. : 6,332,641 B1
DATED : December 25, 2001
INVENTOR(S) : Fumio Okana

It is certified that error appears in the above-identified patent and that said Letters Patent is hereby corrected as shown below:

Column 2,
Line 7, after "have" delete "-".

Column 7,
Line 1, change "lob" to -- 10b --.

Column 8,
Line 12, after "upon" insert -- side collison as described above can be absorbed. --

Signed and Sealed this

Sixteenth Day of July, 2002

*Attest:*

*Attesting Officer*

JAMES E. ROGAN
*Director of the United States Patent and Trademark Office*